H. A. SÉVIGNÉ.
BREAD WRAPPING MACHINE.
APPLICATION FILED JAN. 11, 1911.
1,117,260.
Patented Nov. 17, 1914.
9 SHEETS—SHEET 1.
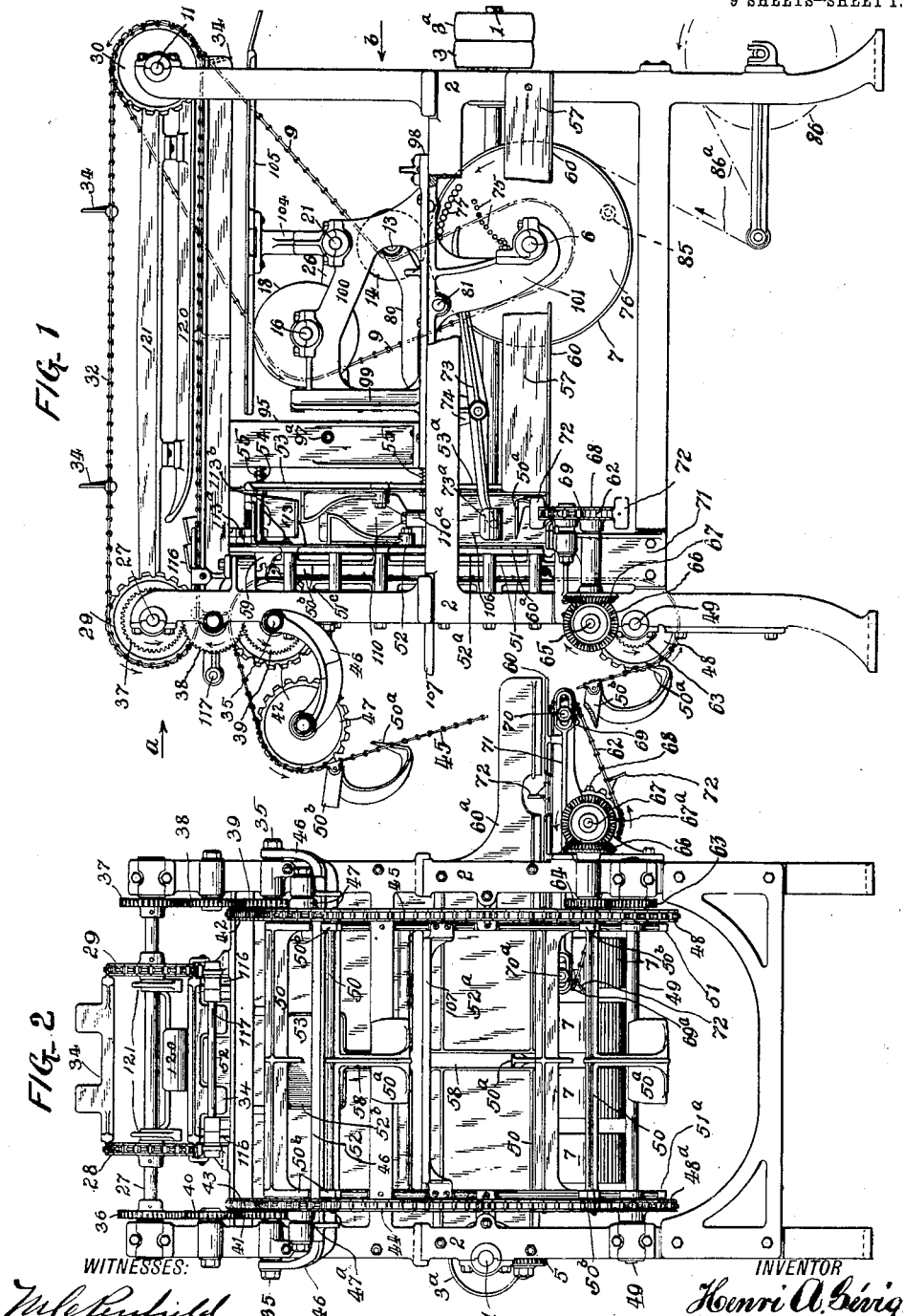
WITNESSES:
INVENTOR
Henri A. Sévigné
BY
his ATTORNEY H. A. SÉVIGNÉ.
BREAD WRAPPING MACHINE.
APPLICATION FILED JAN. 11, 1911.
1,117,260.
Patented Nov. 17, 1914.
9 SHEETS—SHEET 2.
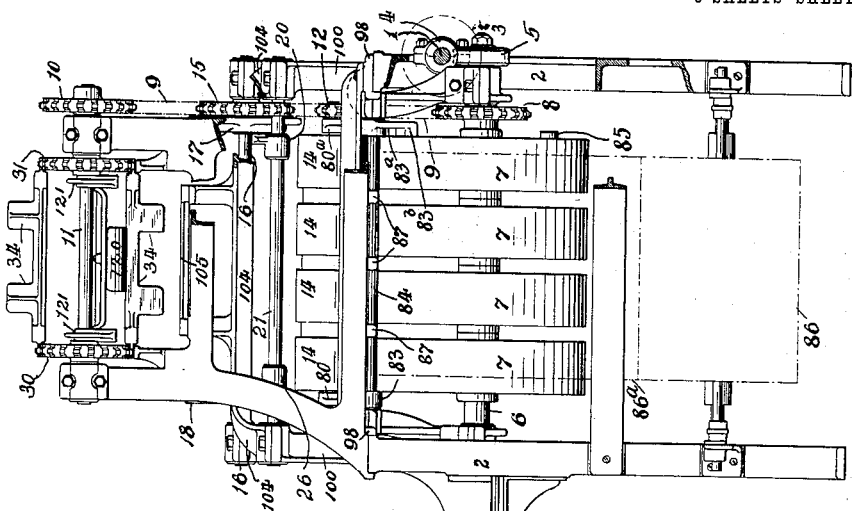
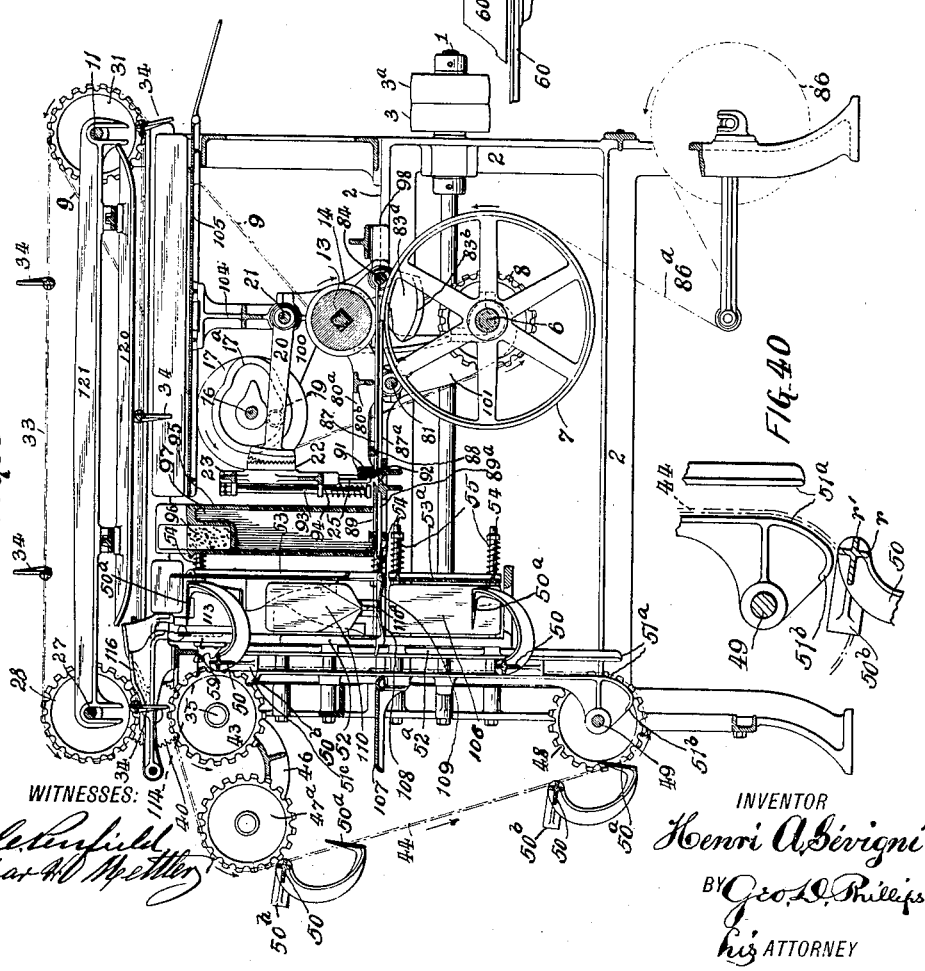
WITNESSES:
INVENTOR
Henri A. Sévigné
BY Geo. D. Phillips
his ATTORNEY H. A. SÉVIGNÉ.
BREAD WRAPPING MACHINE.
APPLICATION FILED JAN. 11, 1911.
1,117,260.
Patented Nov. 17, 1914.
9 SHEETS—SHEET 3.
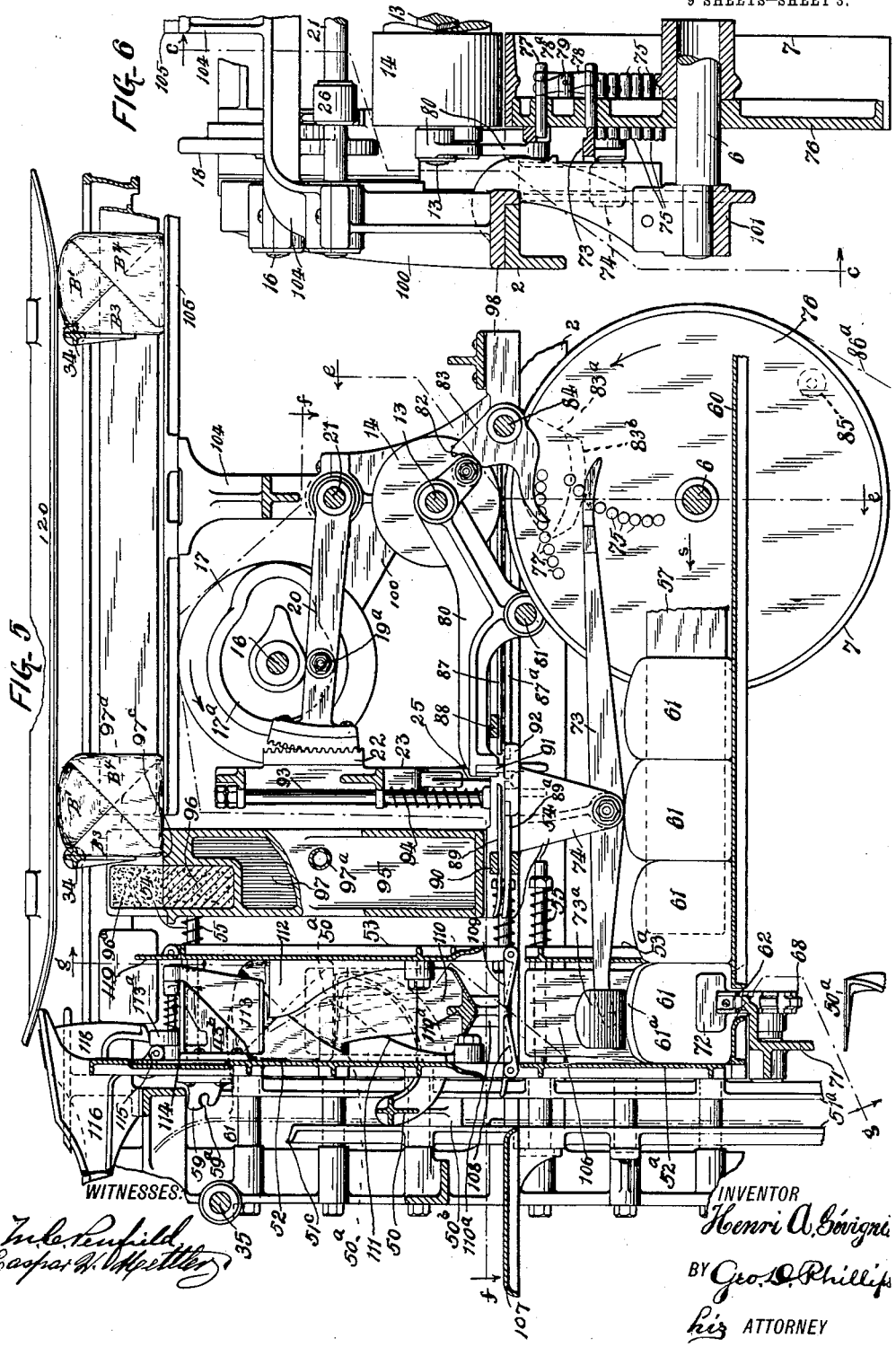
INVENTOR
Henri A. Sévigné
BY Geo. D. Phillips
his ATTORNEY

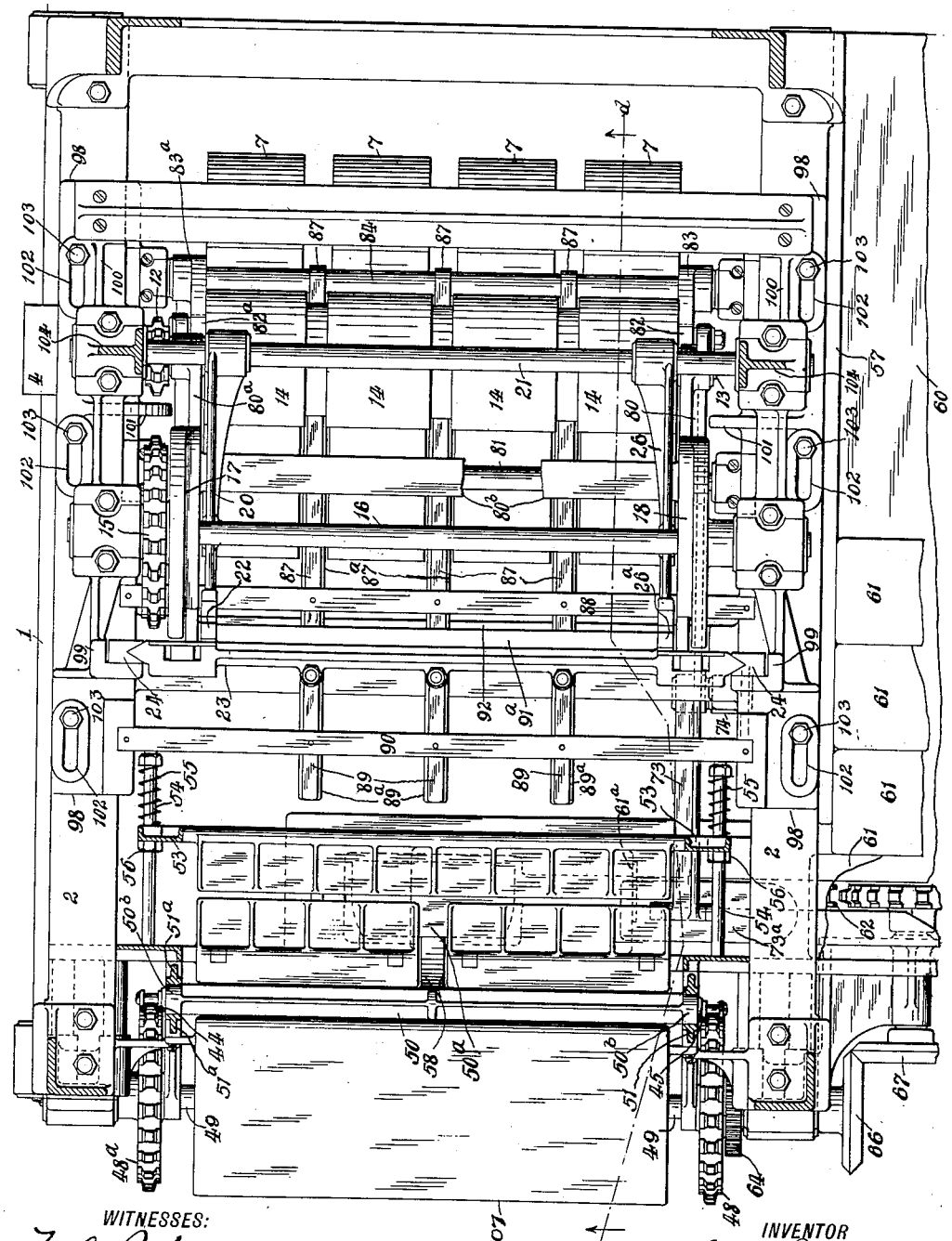

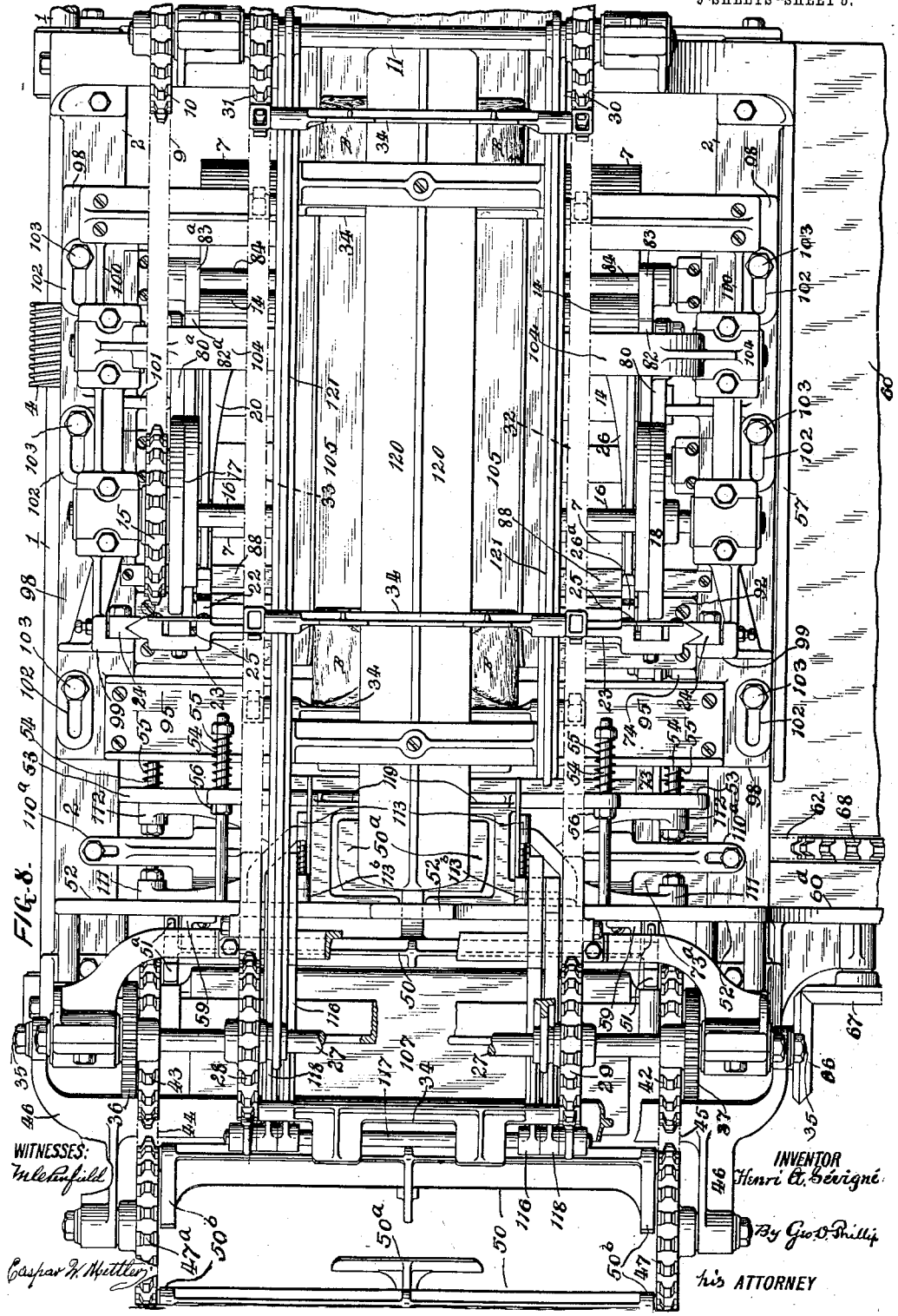

H. A. SÉVIGNÉ.
BREAD WRAPPING MACHINE.
APPLICATION FILED JAN. 11, 1911.
1,117,260.
Patented Nov. 17, 1914.
9 SHEETS—SHEET 6.
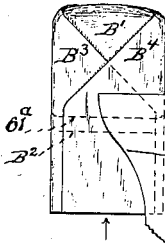
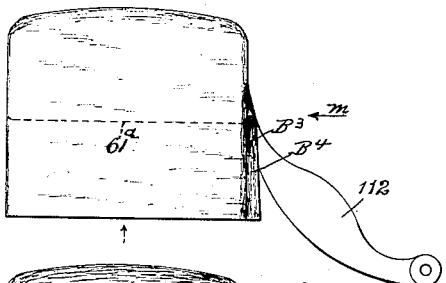
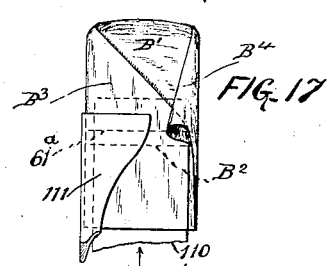
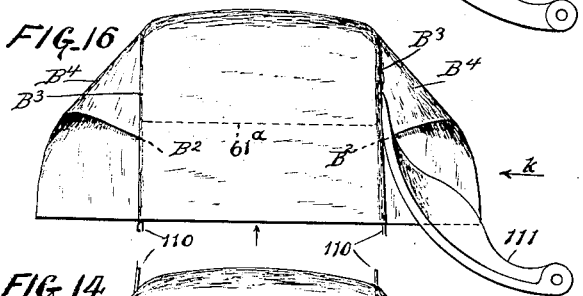
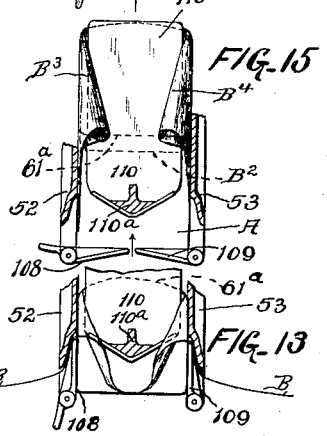
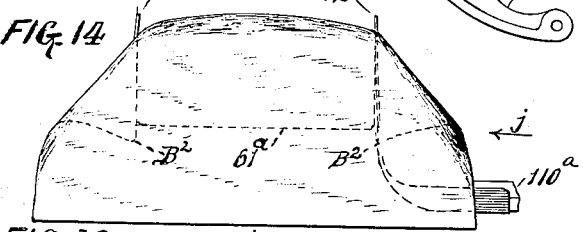
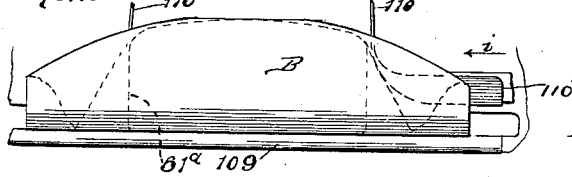
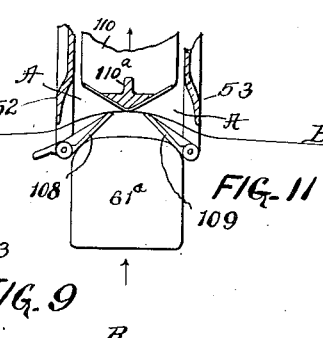
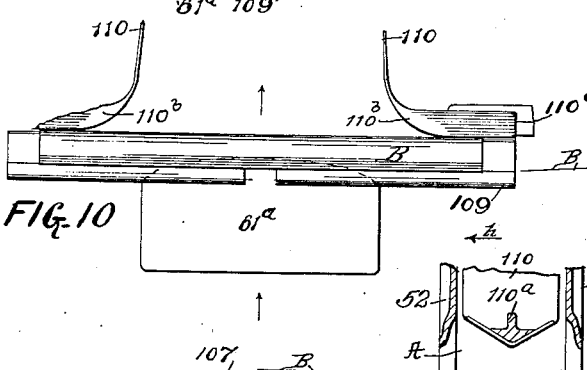

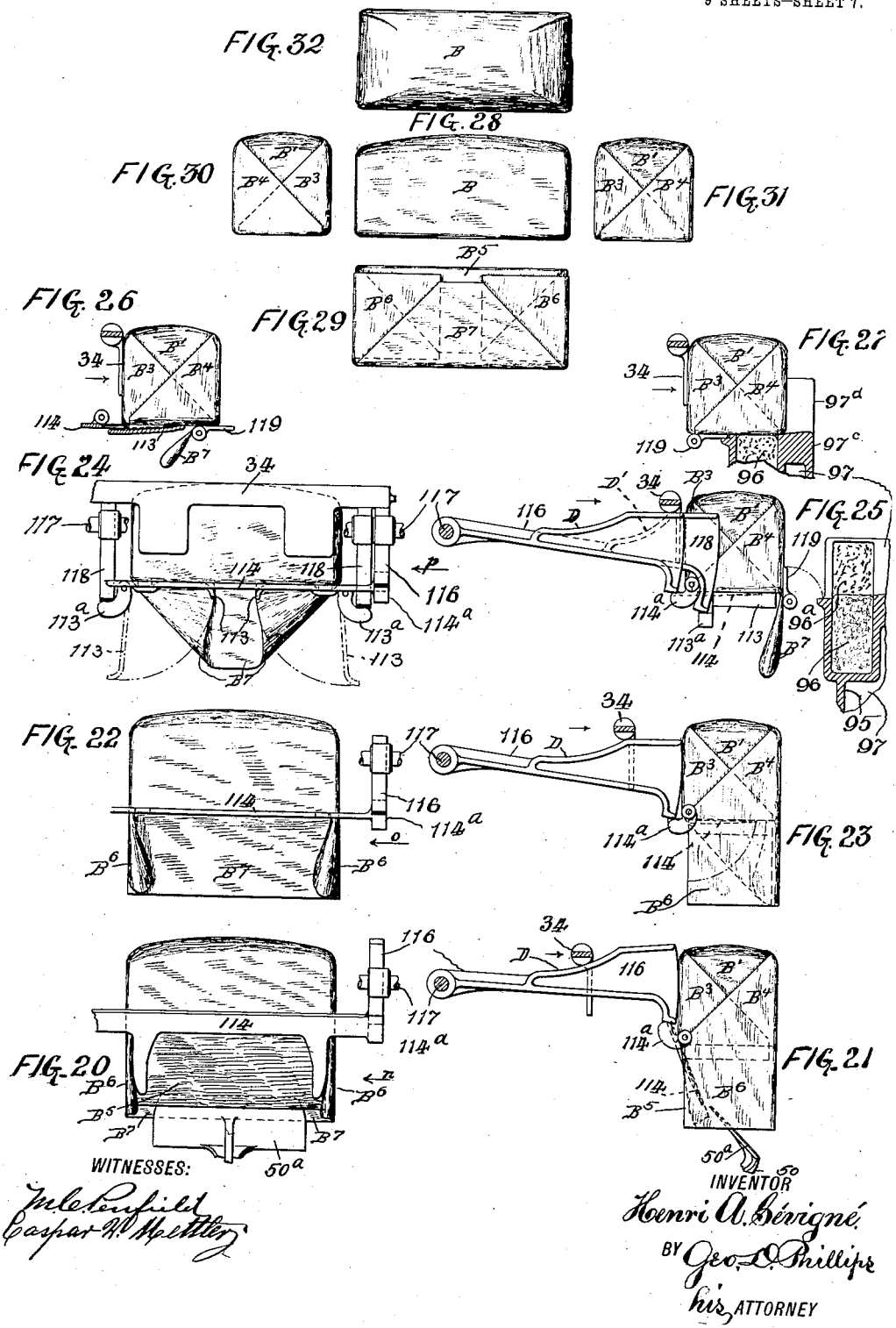

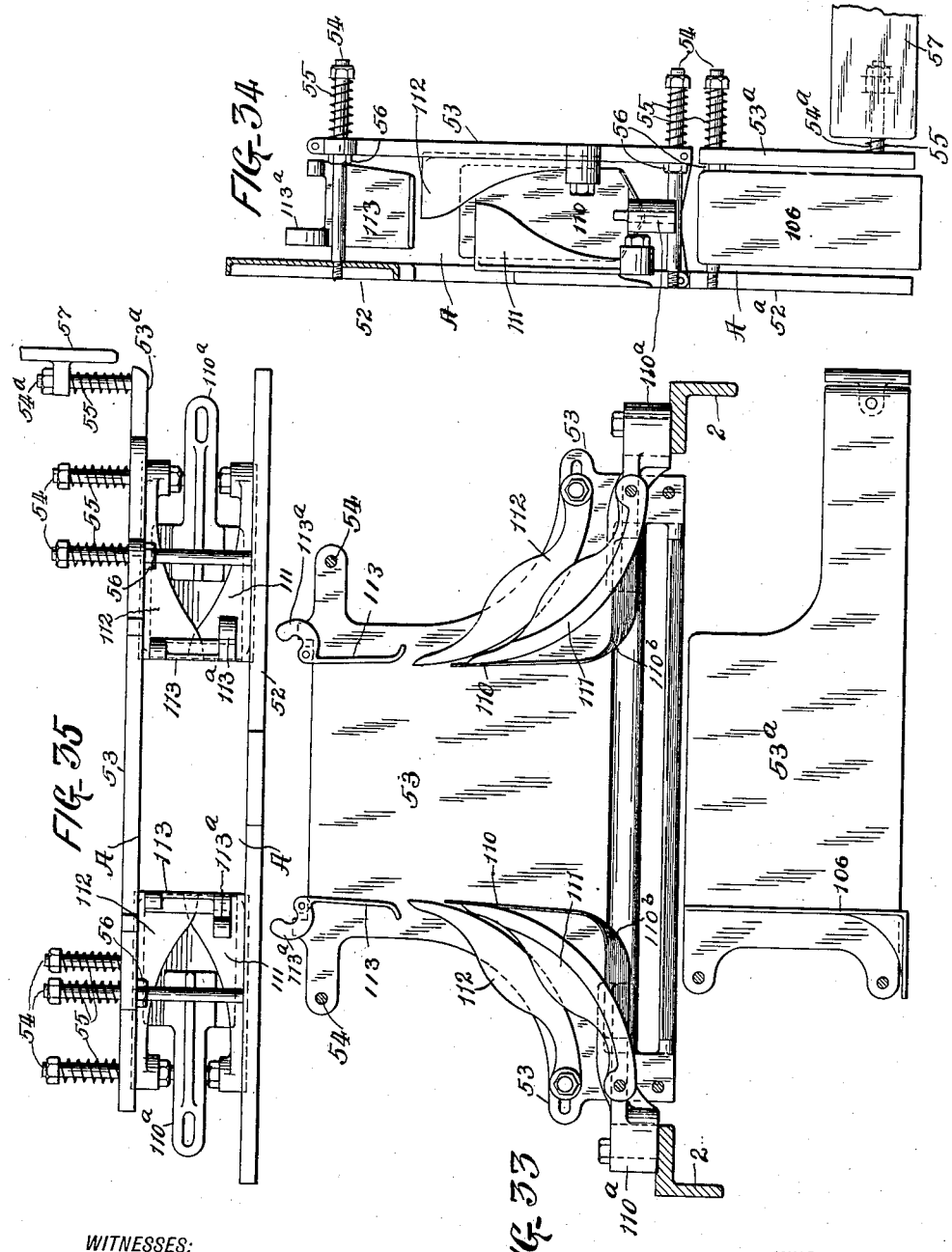

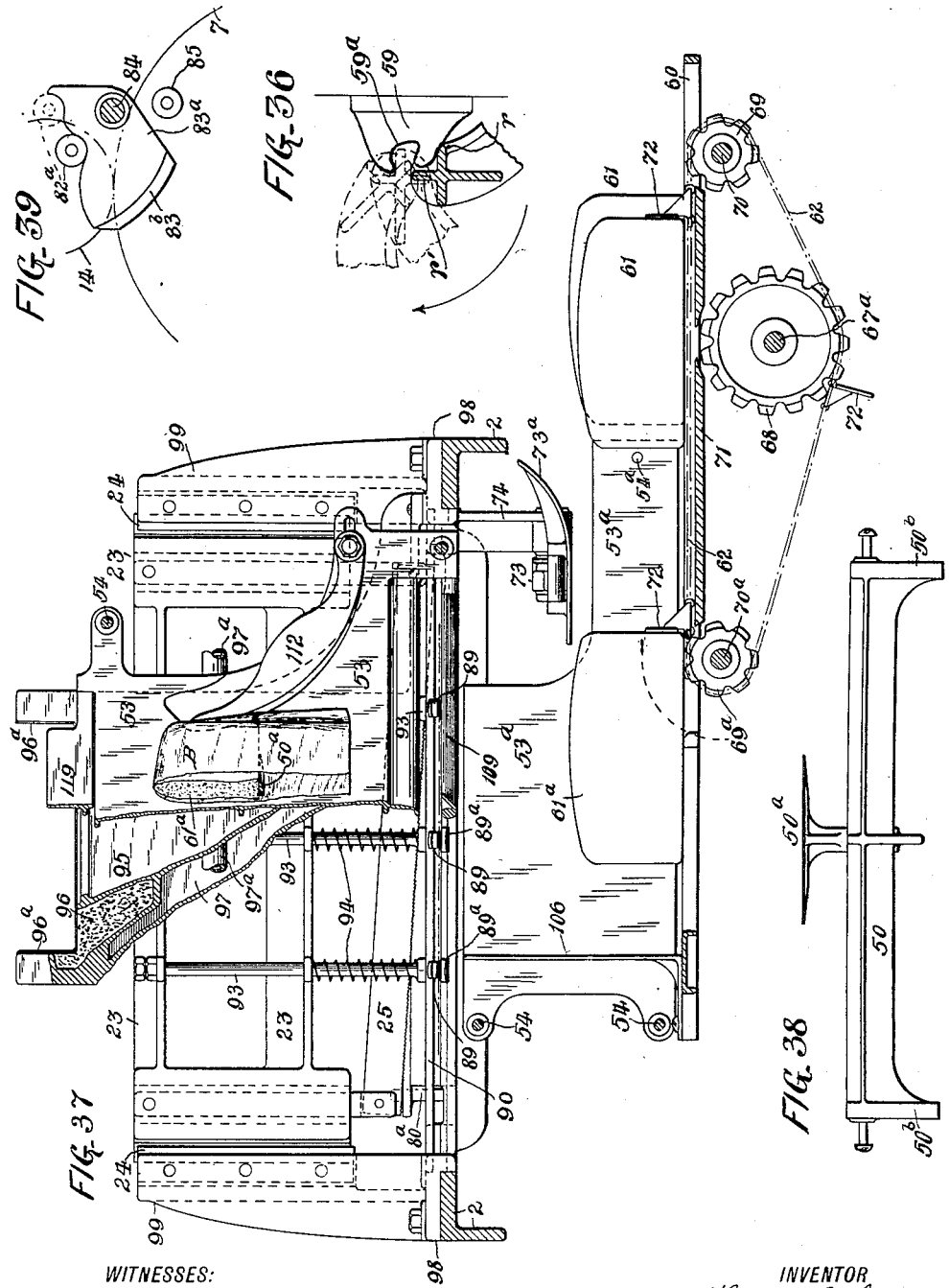

UNITED STATES PATENT OFFICE.

HENRI A. SÉVIGNÉ, OF NASHUA, NEW HAMPSHIRE, ASSIGNOR OF ONE-HALF TO BENJAMIN A. BALL, OF BOSTON, MASSACHUSETTS.

BREAD-WRAPPING MACHINE.

1,117,260.  Specification of Letters Patent.  Patented Nov. 17, 1914.

Application filed January 11, 1911. Serial No. 602,062.

*To all whom it may concern:*

Be it known that I, HENRI A. SÉVIGNÉ, citizen of the United States, residing at Nashua, in the county of Hillsboro and State of New Hampshire, have invented certain new and useful Improvements in Bread-Wrapping Machines; and I do hereby declare the following to be a full, clear, and exact description of the invention, such as will enable others skilled in the art to which it appertains to make and use the same.

My invention relates to wrapping machines adapted to automatically wrap and seal paper wrappers about various kinds of articles, and it relates more especially to wrapping articles that vary in size like, for instance, loaves of bread wherein the variable quantities of yeast and heat will cause the loaf in the process of baking to vary in height, while the length and width of the loaf, being confined in the baking pan, will be uniform. In automatically wrapping articles of uniform size like, for instance, a cake of soap, the paper can be cut of uniform length, but with articles that vary in size, like a loaf of bread, the length of the paper wrapper must of necessity vary with each individual loaf, otherwise if the paper was cut of uniform length for all loaves, the smaller ones would have a surplus of paper projecting from the edge of the loaf, making thereby not only an unsightly package but affording means for accidentally and prematurely breaking or unsealing the wrapper. Therefore, among the many improved features comprising my present invention is mechanism whereby each individual loaf determines the length of its own wrapper.

Referring to the drawings wherein the several figures and letters of reference indicate like parts throughout the several views: Figure 1 represents a front elevation partially broken of the machine; Fig. 2 is an end elevation of the machine looking in the direction of arrow *a* of Fig. 1; Fig. 3 a longitudinal central sectional view of the machine; Fig. 4 is an end elevation of the machine partly in section loooking in the direction of arrow *b* of Fig. 1, showing a portion of the opposite end of the machine removed; Fig. 5 is an enlarged broken side elevation partly in section of a part of the machine on line *c c* of Fig. 6, and *d d* of Fig. 7; Fig. 6 is an enlarged broken view partly in section of the paper feed drum and its mechanism on line *e e* of Fig. 5; Fig. 7 is an enlarged sectional plan view on lines *f f* of Fig. 5; Fig. 8 is an enlarged broken upper plan view of the machine; Fig. 9 is an enlarged detail end elevation of a loaf of bread in the first stage of the wrapping process, together with part of the wrapping mechanism; Fig. 10 is an enlarged detail side elevation of the loaf and wrapping mechanism in the next succeeding stage of the wrapping process; Fig. 11 is an end elevation looking in the direction of arrow *h* of Fig. 10; Fig. 12 is an enlarged detail side elevation of a loaf and wrapping mechanism in the next succeeding stage of the wrapping process; Fig. 13 is an end elevation of Fig. 12 looking in the direction of arrow *i;* Fig. 14 is an enlarged detail side elevation of the loaf and wrapping mechanism in the next succeeding stage of the wrapping process; Fig. 15 is an end elevation looking in the direction of arrow *j* of Fig. 14; Fig. 16 is an enlarged detail side elevation of loaf and wrapping mechanism in the next succeeding stage of the wrapping process; Fig. 17 is an end elevation looking in the direction of arrow *k*, Fig. 16; Fig. 18 is an enlarged side elevation of a loaf and wrapping mechanism in the next succeeding wrapping stage; Fig. 19 is an end elevation looking in the direction of arrow *m* of Fig. 18; Fig. 20 is an enlarged side elevation of a loaf and wrapping mechanism in the next succeeding wrapping stage; Fig. 21 is an end elevation of Fig. 20 looking in the direction of arrow *n;* Fig. 22 is an enlarged detail side elevation of a loaf and wrapping mechanism in the next succeeding wrapping stage; Fig. 23 is an end elevation of Fig. 22 looking in the direction of arrow *o;* Fig. 24 is an enlarged detail side elevation of a loaf and wrapping mechanism in the next succeeding wrapping stage; Fig. 25 is an end elevation of Fig. 24 looking in the direction of arrow *p*, also a broken sectional view of the waxing tank; Fig. 26 is an enlarged end elevation of the package containing a loaf showing the beginning of the final bottom fold and mechanism connected therewith, also showing one of the horizontally traveling carriers engaged with the package; Fig. 27 is an enlarged end elevation of the package, broken sectional view of the sealing tank showing the package advanced over the same; Fig. 28 is an enlarged detail side elevation of a complete package; Fig. 29 is an enlarged detail bottom plan view of a complete package; Figs. 30 and 31 are enlarged detail end elevations of the complete package; Fig. 32 is an enlarged upper plan view of a complete package or wrapped loaf; Fig. 33 is an enlarged detail elevation partly in section of the bread wrapping mechanism and rear movable plate of the elevator shaft; Fig. 34 is an end elevation of Fig. 33 showing both the stationary and movable plates of the elevator shaft; Fig. 35 is an enlarged detail upper plan view of Fig. 34; Fig. 36 is an enlarged detail broken view partly in section of one of the vertically operating loaf carriers, and one of the turning cams for the same; Fig. 37 is an enlarged view of the cutting off knife and its sliding gate and supports for the gate, sectional view of the machine frame; broken view partly in section of the waxing tank and heating chamber, also view of the loaf feeding mechanism on line $g$ $g$ of Fig. 5; Fig. 38 is an enlarged detail side elevation of one of the vertically operating loaf carriers; Fig. 39 is an enlarged detail view of the feed roll lifting cam and broken view of the feed roll and feed drum, and sectional view of the cam rocker shaft; and Fig. 40 is an enlarged broken view of one of the vertically operating carrier guides, sectional view of its supporting shaft, also broken view partly in section of one of the carriers about to enter the guide.

All of the rotatably moving parts run continuously and are initially driven from the shaft 1 journaled in the machine frame 2 and carrying the tight pulley 3 and loose pulley $3^a$ and the worm 4, Fig. 4, meshing with the worm gear 5 on the shaft 6 carrying the paper drum 7. While this drum, for convenience of manufacture, is composed of several individual parts or pulleys, they are all connected to the same shaft and rotate in unison and form, for the purpose required, the office of a solid drum, and as such will hereinafter be designated and indicated by a single reference number.

8, Figs. 3 and 4, is a sprocket wheel mounted on the drum shaft carrying the sprocket chain 9 (see also Figs. 1 and 8) connecting with the upper sprocket wheel 10 on shaft 11. This chain also intermediately connects with the sprocket wheel 12 on the shaft 13 carrying the paper feed roll 14, and the sprocket wheel 15 (see also Fig. 7) on the cam shaft 16 carrying the two knife actuating cams 17 and 18. These cams have grooves in their inner vertical faces, one of which grooves, $17^a$, is shown at Figs. 3 and 5 carrying the roll 19, shown only at Fig. 3. This roll is mounted on the pin $19^a$, shown only at Fig. 5, which pin is secured to the toothed segment arm 20 mounted on the rocker shaft 21. The toothed end of this segment arm engages the rack 22 secured to one end of the vertically sliding gate 23 (see also Fig. 37) mounted in the ways 24 and carrying the paper cutting knife 25. 26, Fig. 7, is another toothed segment arm mounted on the other end of the rocker shaft 21 with its toothed end engaging with the rack $26^a$, Figs. 1, 7 and 8, secured to the opposite end of the knife carrying gate 23. This latter arm is similarly equipped as the arm 20 with a roll (not shown) to engage with a groove (not shown) in the cam 18.

27, Figs. 1, 2, 3 and 8, is a shaft parallel with the shaft 11 and carries the sprocket wheels 28 and 29 in alinement with the sprocket wheels 30 and 31, Figs. 4 and 8, on shaft 11. These wheels are operatively connected together by the horizontally operating endless carrier chains 32 and 33.

34 are carriers transversely and rigidly connected to the two chains. These carriers are adapted to move the packages in a horizontal plane in a manner and for a purpose to be hereinafter more fully described.

Referring to Figs. 1, 2, 3 and 8, 35 are studs carrying the adjustable arms 46 whose free ends carry the idler sprocket wheels 47, $47^a$. Motion is transmitted to the sprocket wheels 42, 43, through the medium of the spur gears 36, 37, 38, 39, 40 and 41, the gears 39 and 41 being rotatably secured to the sprocket wheels 42 and 43 on studs 35. 48 and $48^a$ are similar sprocket wheels on the lower shaft 49, and 44 and 45 are endless carrier chains connecting these upper and lower sprocket wheels.

The vertically operating carriers, Figs. 1, 2, 3, 7, 8 and 38, for elevating the loaves from the lowest to the high point during the operation of wrapping, which operation will presently be more fully described, comprise cross carrier bar 50 adapted to be journaled on the two parallel carrier chains 44 and 45.

$50^a$ is a plate integral with the bar for supporting a loaf when said plate is in a horizontal position, and $50^b$ are short tail pieces at each end of the bar to maintain the plate or shelf portion of the bar in a horizontal position when working.

51 and $51^a$ (see also Figs. 1, 2, 5, 7 and 8,) are vertical guides located within the machine frame for guiding the carriers in their upward vertical travel as follows: Referring particularly to Figs. 3 and 40, when any one of the carriers has reached the lowest position of its travel about the chain carrying sprocket wheels 48, $48^a$, the tail pieces $50^b$ of the carrier will engage the curved portion $51^b$ of the guides, which engagement will turn the carrier so that the pivot end of the tail pieces will be drawn up between the guide bars 51, $51^a$, and when so placed the plate 50ª of the carrier will have assumed a horizontal position, in which position it will be maintained throughout its upward travel by the engagement of the before mentioned tail pieces of the carrier with the guide bars. The upward travel of the carriers, when their supporting plates are in the horizontal position just described, is through an elevator shaft formed (see particularly Figs. 33, 34 and 35) by the stationary front plates 52 and 52ª, and the movable rear plates 53 and 53ª. These rear plates are loosely mounted on the studs 54 severally anchored in the front plates as shown.

55 are springs adapted to maintain the plates under spring tension against the adjusting nuts 56. The short stud 54ª extends freely through a lug of the guide plate 57. The arrangement of these several plates just described, form the guideway or elevator shaft A, shown more clearly at Fig. 35, through which, as before mentioned, the carrier plates and loaves of bread are guided and held in workable position in their upward travel through the wrapper folding mechanism presently to be described.

58, Fig. 2, are slots in the stationary front plates to admit the curved shank portion of the plate 50ª of the carrier when said carrier is traveling upward. The springs of the movable back plates are adapted to keep an even tension on a loaf in its passage up the elevator shaft.

The front portions, Figs. 1 and 5, of the guides are cut away at the point 51ᶜ to afford an opportunity for the carriers to be turned under and carried over the sprocket wheels 42, 43, as follows: 59, Figs. 1, 3, 5 and 8, and particularly Fig. 36, are cam lugs attached to the front plate 52 and are so located as to engage cross bars 50 of the carriers. These cross bars have the longitudinal ribs r and r', and when, in the upward movement of the carrier, the rib r contacts with the lower curved edge of the cam 59, it will cause the carrier to drop, in the direction indicated by the arrow in Fig. 36, and cause the rib r to enter the opening 59ª. Now, this engagement of said ribs with the cams will drop the carrier away from a loaf and throw it through the opening 52ᵇ, Fig. 2, of the upper stationary front plate 52 and allow it again to swing freely from its pivotal support on the chains 44 and 45 during its downward travel.

The arrangement for feeding loaves into the machine and measuring the length of paper for each individual loaf and determining the length of the paper by the height of the loaf, is as follows: 60, Figs. 1, 2, 5 and 7, is a platform on which the loaves 61 are either automatically or manually fed in the direction of arrow s, Fig. 5, with their inner ends resting against the guide plate 57. These loaves, for better illustration of the idea of paper measuring, are represented of different heights.

60ª, Figs. 2, 4 and 8, is a stop plate adapted to limit the forward or sidewise feed of a loaf, and below is the endless cross feed carrier chain 62 adapted to feed the loaves lengthwise into the machine and at right angles to the platform 60. This chain is made to run continuously from the sprocket wheel shaft 49 through the medium of the spur gear 63, Figs. 1 and 2, together with Fig. 7, spur gear 64 on the short shaft 65, whose outer end carries the bevel gear 66, meshing with the bevel gear 67 on the short shaft 67ª, the opposite end of which shaft carries the sprocket wheel 68 driving said chain 62. This chain also passes around the two smaller sprocket wheels 69 and 69ª, seen more clearly at Fig. 37, mounted on the pins 70 and 70ª, adjustably located in end slots of the bracket 71, Fig. 2, which bracket is secured to the machine frame.

72 are bread carriers rigidly mounted on the cross feed chain 62.

73, Figs. 1, 5, 7 and 8, is the paper gage pivotally supported in the bracket 74 and carrying the shoe or feeler 73ª pivotally supported on its forward end and with which shoe each loaf is brought in contact to raise that end of the gage a distance varying in accordance with the difference in the heights of the loaves and, of course, correspondingly depressing the opposite end of the gage to engage with one of the series of sliding gage pins 75 projecting through the plate 76 (see also Fig. 6). The inner ends of these pins are operatively connected to the upper series of sliding tripping pins 77 through the medium of a series of rocking levers and their fulcrums. Two of these rocking levers, 78 and 78ª, are only seen at Fig. 6, and one fulcrum stud 79 for the lever 78. It will be observed that the outer ends of the pins 75 are slightly grooved to form a better contact with the lever 73 by centralizing said lever with any one of the pins with which it engages.

The shoe 73ª is pivotally supported on the end of the gage 73 so as to have a transverse rocking motion with respect to a loaf. In other words, if a loaf is higher on one side than on the other, or, so to speak, not level on the top, the shoe will tilt so as to contact with both the high and low points and thus equalize or average the movement of the gage so as to feed the required amount of paper to form a wrapper for a loaf having an uneven upper transverse surface. On the other hand, if the shoe was rigid, the wrapper would be cut to conform to the highest transverse point of the loaf which would leave a surplus of paper over the low side of the loaf. While this feature of the tilting shoe is not absolutely a necessary part of the gage in feeding paper to form a wrapper to suit each individual loaf, yet with it a neater package is produced.

The paper roll feeding shaft 13 is journaled in the outer ends of the paper clamp rocking levers 80, 80ª, Figs. 4, 5, 7 and 8, which are joined together by cross rib 80ᵇ secured to the rock shaft 81, the shaft being journaled in an adjustable carriage presently to be described. The free ends of these levers carry roll 82, Figs. 5, 7 and 8, and 82ª, Figs. 7, 8 and 39, the former to engage with the feed roll trip lever 83, on the front end of the drum 7, and the latter with the feed roll lifting lever 83ª, on the rear end of the drum, both of which levers are secured to the rock shaft 84.

85 (see also Fig. 4) is a roll on the opposite end of the drum adapted to engage the lever 83ª and raise the paper feed roll from contact with the drum 7.

86, Figs. 1, 3 and 4, is a roll of paper, and 86ª the paper being delivered therefrom to the paper feed drum.

Referring to Fig. 5, when the loaf 61ª passes under the shoe 73ª of the gage lever 73, the opposite end of said lever is shown depressed to engage the third pin from the top of the row of pins 75 in the plate 76 of the paper feed drum 7. This will, as before mentioned, throw out the third pin from the right of the upper row of pins 77 and directly in the path of the tail piece of the lever 83 with which it engages to tilt said lever up and allow the paper feed roll 14 to drop on the drum and feed the interposed paper forward. The tripping of the lever 83, just described, will place the paper feed roll lifting lever 83ª into the position shown at Fig. 39, and when the roll 85 engages the foot 83ᵇ of said lever it will elevate the paper feed roll out of contact with the drum. This action will throw the foot portion 83ᵇ into the dotted position shown at Fig. 5, so that the roll 85 may revolve without interruption when the paper is not feeding. Fig. 1 shows this non-feeding position of the various parts of the feeding devices above described.

Referring to Fig. 5, the distance from a certain one of the upper row of pins 77 to the roll 85 will determine the length of the paper wrapper for the loaf actuating the gage lever 73. In other words, the distance from the right hand pin to the roll represents the shortest wrapper for a minimum loaf, and the plate 76 is adjusted and set accordingly. Therefore, as the feed always stops at the same point in the revolution of the drum, viz.: when the roll 85 engages the lift lever 83ª to lift the feed roll, it is only necessary in feeding paper for a longer wrapper to start the feed earlier. The distance between each of said pins represents a variation of one half inch in the length of the wrapper to be cut.

The paper after passing around the drum 7 enters between the series of thin metal guide strips 87 and 87ª, one overlying the other. The upper ones of these series of guide strips are attached to the cross bar 88, seen more clearly at Fig. 7, with their outer ends supported on the rocker shaft 84. Forward of the knife carrying gate 23 are the short guide strips 89 and 89ª (see also Figs. 5 and 7), which strips are in longitudinal alinement with the before mentioned strips 87. These guide strips prevent the rapidly advanced paper from buckling prior to reaching position over the loaf that is to be wrapped. The upper ones, 89, are attached to the cross bar 90.

91, Fig. 5, is a rubber strip extending across the machine and is secured in the free ends of rocking levers 80 and 80ª, and also in the head or cross bar 91ª, Fig. 7, connecting said free ends so that, as soon as the feed roll 14 is raised and the feeding of the paper is thereby stopped, the elevation of said roll will depress the forward end of levers 80 and 80ª and grip or press the paper firmly against the cross bar 92, Figs. 5 and 7, and back of the cutting off knife and prevent its dropping back from the point it occupied when a section was cut therefrom. Means are provided for gripping or clamping the paper forward of the cutting off knife to prevent a severed section of paper being drawn downward with the descending knife. Such means consist, Figs. 5, 7 and 37, of the rods 93 operatively connected to the knife carrying gate 23. When, therefore, the gate descends, these rods are carried with it, and their lower ends will contact with the upper guide strips 89 and depress the same to grip and temporarily hold the inner end of a severed section of paper. The rods will have clamped the paper before the knife begins to cut, and the springs 94, Fig. 37, carried by the rods, will simply be compressed by the descending gate to increase the holding power of the rods without hindering the action of the gate.

95, Figs. 1, 5 and 37, is a tank having the upper chamber 96 filled with felt or other like substance saturated with wax or other like sealing material, and the heating chamber 97 below into which projects the gas heater pipe 97ª carrying a burner (not shown) for heating the wax to a consistency suitable for sealing paper. The felt or similar material in the chamber 96 act as a wick to present the sealing material in position so that the wrapped loaf will be wiped over it.

98 (see particularly Figs. 1, 3, 5, 7 and 8) is the base of a carriage adjustably supported on the upper surface of the frame 2, and on this base is supported the tank 95. The uprights 99 (see also Fig. 37) supporting the knife carrying gate 23, standards 100, Figs. 1, 3, 4 and 5, carrying shafts 16 and 21; depending brackets 101 carrying the drum shaft 6, and the depending bracket 74 carrying the gage lever 73, are integral with the base of the carriage 98. This base has the slots 102, Fig. 7, to permit of a longitudinal movement of the carriage on the frame 2, and is secured in any of its adjusted positions by the bolts 103. The standards 104 are removably supported on the standards 100 and are adapted to support the upper plate or table 105 and, of course, move with the carriage. The object of this adjustable feature of the carriage is to increase or decrease the distance between the paper cutting knife and the center of the loaf to accommodate for different widths of loaves. In other words, if a machine is ordered by a customer to wrap a loaf of four inches wide, the carriage is set accordingly, and if a different width of loaf is to be wrapped, the carriage is set to accommodate any difference in the widths of loaves that may be required. This carriage adjustment relates particularly to the advantage of the manufacture, as without this adjustable feature an entire machine would have to be made for different widths of loaves.

The operation of the machine is as follows: The loaf 61ª, Fig. 37, having passed under the shoe 73ª of the gage 73 to actuate the mechanism to feed and cut off the length of a wrapper for this particular loaf in the manner before described, and during this paper feeding and cutting off operation the loaf 61ª is being moved along by the carrier 72 to its position against the adjustable end plate 106 in readiness to be carried up by one of the carriers 50. The carrier shown at Fig. 38 being in the proper position relative to the loaf shown in Fig. 37 when said loaf is located against the before mentioned end plate 106. In the mean time, the section of paper constituting the wrapper will lie across the vertical guideway or elevator shaft A with its outer end supported by the shelf 107, Fig. 9. In this view is shown the loaf as having been raised by the carrier 50 in close proximity to one or more paper or wrapper lifters 108, 109 in its upward travel through the guideway elevator shaft A, and overlying said lifters is the wrapper section B. These lifters are hinged at the lower ends of the stationary front plate 52 and the spring actuated rear plate 53, Figs. 3, 5, 6, 7, 34 and 37. Referring particularly to Fig. 7, it will be observed that the lifter 108 is in two sections, while the lifter 109 is of one piece. The object of dividing the former is simply to leave sufficient space for the curved shank of the carrier to pass between the two sections and conform with slot 58 in front plate 52, Fig. 2. Therefore, this divided section will be considered as one and will be designated by the same figure of reference.

The loaf in its upward passage first contacts with the wrapper lifters 108, 109, Fig. 9, raising them to form an upward curve in the wrapper B in advance of the loaf as shown at Figs. 10 and 11. The continued upward travel of the loaf, in the direction of the arrows, will force the lifters back against the plates 52 and 53, representing the sides of the guideway or elevator shaft A, and when thus thrown back the under face of the lifters will be flush with the inner faces of said plates to serve as guides for the loaf about to enter the elevator shaft, as shown at Fig. 13.

The object of these paper or wrapper lifters is to raise the wrapper in advance of and directly over the loaf so as to draw the wrapper into the elevator shaft true and even. In other words, as the paper wrapper section is in no wise restrained but lies loosely over the lifters, and, as the upper surface of no two loaves are exactly alike as to shape, one end of the loaf being frequently lower than the other, it is quite evident, therefore, that if such a loaf were first brought in contact with the wrapper, the higher end would first engage the wrapper to form a narrow pivotal point on which the wrapper would skew or turn and thus prevent its entering the guideway true and even, which would result in an imperfectly wrapped package. Another objection to the loaf first contacting with the wrapper, even if said loaf should happen to be perfect in all respects as to its upper surface, there would still be the tendency to displace or skew the wrapper before it could be fully within the elevator shaft, and this by reason of the fact that the air confined between the wrapper and loaf would disturb the light and unsupported wrapper and cause it to skew or turn before it could be firmly and securely located in the elevator shaft. But with the wrapper lifters extending across the full width of the wrapper, and positively and equally engaging this entire width, the central portion of the wrapper is crowned or curved upward in advance of the loaf with the same regularity and uniformity of curve for each loaf without regard to its shape. As soon as the wrapper lifters have been forced into recessed portions of the plates 52 and 53, Fig. 13, they will exert a tension on the sides of the wrapper, now located between said lifters and plates, so that the upward movement of the loaf will draw evenly on the outer projecting ends of the wrapper. As soon as the loaf has passed the lifters, said lifters will gravitate to their normal horizontal position as shown at Fig. 15.

110, Figs. 1, 3, 5, 9, 10, 11, 12, 13, 14, 15, 16, 17, 33, and 34, are breakers between which the ends of the loaf engage to break down that part of the paper wrapper adapted to form the ends of the completed package. The enlarged feet 110ª of these breakers, Figs. 1, 3, 5, 8, 33, 34 and 35, and particularly Fig. 33, are adjustably secured to the machine frame 2, while the uprights 110 are made thin and sufficiently flexible to exert a tension on the wrapper and loaf so as to break down the wrapper without fracturing it.

Referring to Figs. 33 and 34, it will be seen that the lower edges 110ᵇ of the breakers are flared or curved outward to form an easy initial contact with a wrapper. This part of the breakers lies just above the wrapper lifters 108, 109, Fig. 9, so that these breakers will be brought into requisition immediately after the lifters have begun to act as seen at Fig. 11. The upward travel of the bread will, in its passage through the breakers, break down, as before mentioned, the wrapper to form a covering for the ends of the loaf. In Figs. 14 and 15 is shown the completion of this breaking down process, although the lower part of the loaf is still within the elastic embrace of the breakers. The part B¹ of the wrapper thus broken down by the breakers is shown at Figs. 17 and 19, and the lower edge B² of B¹ (see also Figs. 14 and 15) is shown projecting just below the bottom edge of the loaf 61ª. The parts B¹ of the wrapper thus forced down hard against the ends of the loaf by the action of the breakers will leave the rolled over portions B³ and B⁴ to form corner end folds overlapping the parts B¹ as follows: 111 (see particularly Figs. 5, 8, 16, 17, 33, in contact with the upper helical corner folders 112 (see also Figs. 18 and 19), which pivoted to the stationary plate 52 and located back of the breakers 110. As soon, therefore, as the wrapper is in the condition shown at Figs. 14 and 15, the upward progress of the loaf will bring it against the folders 111 to turn over the folds B³ hard against the end breakers 110. The further upward progress of the loaf will bring it in contact with the upper helical corner folders 112 (see also Figs. 18 and 19), which folders are adjustably pivoted to the inner plate 53 and, like the folders 111, lie outside of the breakers and at each end of the loaf. These upper helical folders turn over the parts B⁴ and overlapping B³ as shown at Figs. 18 and 19. The above description completes the end folding of the wrapper.

As shown by comparing Figs. 33, 34, 35 and 37, the helical folders 111, 112, are pivotally supported at a distance from the path of movement of the end surfaces of the loaves, and are free to be swung upwardly and outwardly by a passing loaf, and to return by gravity. This provides for properly wrapping loaves which are less in area at their bottoms than at their tops (a common shape of bread loaves). The spiral-shaped surfaces of these folders turn or guide the corner folds smoothly inward, while the wide and substantially straight edges smooth the turned folds down flat, and cause them to be pressed inwardly against the ends of narrow-bottom loaves because of the freedom of the folders to return inwardly by gravity so they can follow the irregular contours of loaves of such shape as mentioned.

The loaf in its upward progress next encounters the end underneath folders 113 pivotally supported on brackets 113ᵇ adjustably attached to the front plate 52, Figs. 1, 3, 5 and 8, and contacting with the folds previously made by the helical folders serve to smooth and iron down such folds firmly against the ends of the loaf and also to hold them in that position until the next operation is completed as follows: 114, Figs. 3, 5, 20, 21, 22, 23, 24, 25 and 26, is the side underneath folder journaled in the lugs 115 of the front stationary plate 52, one of which lugs is seen more clearly at Fig. 5. When this folder 114 is in its normal depending or vertical position, it lies within a recess in the front plate so that its outer face will lie flush with the inside face of the plate 52. After the end folds, previously described, have been made, the remaining portions of the wrapper project below the loaf in the form of a skirt as shown at Figs. 18, 19, in readiness, as before mentioned, for the action of the folder 114, which folder is actuated to turn up the part B⁵, Figs. 20 and 21, of the skirt against the bottom of the loaf as follows: 116 (see particularly Figs. 2, 5, 8, 20, 21, 22, 23, 24 and 25) are lever cams secured to the rocking shaft 117, and whose inner ends contact with the dogs 114ª of the folders 114. The travel of the endless sprocket chains 32, 33, will cause the round shank portion of its carriers 34 to engage with the curved portion D of the levers 116 and carry the folder 114 into a horizontal position, Figs. 22, 23, 24, 25 and 26, and fold the before mentioned portion B⁵ of the skirt against the underside of the loaf simultaneously with the inward movement of folder 114. The carrier 50, Figs. 20 and 21, then drops away, this retreating movement of the carrier permitting the folders presently described to enter under the loaf to perform their functions. The end portions B⁶ of the skirt are next folded against the underside of the loaf through the medium of the lever cams 118 loosely mounted on the shaft 117 so as to act independently of the lever cam 116.

Referring to Figs. 24 and 25, 113ª are dogs integral with the underneath end folders 113 and with which the lever cams engage to throw the end portions B⁶ of the skirt against the underside of the loaf and overlap the fold B⁵. The latter cam levers are similar in shape to lever 116 and are actuated from the same source, viz.: by contact of the carriage 34 with the curved portions D¹. After the folding process just described is completed, there remains only the portion B⁷ of the skirt to be folded against the bottom of the loaf as shown at Figs. 23 and 24. At the immediate conclusion of these end underneath folds one of the horizontally traveling carriers 34 will engage the loaf to ultimately move it on to the cooling plate 105. In the meantime, the folders 113, 114, remain in their elevated or horizontal positions to support the loaf in lieu of the carrier 50ᵃ that has, as before mentioned, dropped away, and they remain in this position until one of the carriers 34 has engaged the loaf and removed it therefrom. When thus engaged by the carrier, the rear side of the loaf will lie against the spring actuated and normally elevated bridge 119, whose purpose is to span the space between the elevator shaft and the waxing tank, so that, when the loaf, inclosed in its wrapper, is moved rearward, the bridge will be forced over against the tank by the loaf, Fig. 26, to afford safe transit for the package or loaf. The contact of the loaf with the bridge and its travel rearward will force the part B⁷ of the skirt against the bottom of the loaf and will be firmly maintained thereagainst and against the upper surface of the waxing tank and table or cooling plate 105 by the pressure plate 120 secured to the bars 121 whose forked ends rest on the shafts 11 and 27, Figs. 1, 2, 3, 4, 5 and 8. This plate is loosely supported on said shafts so that it will tilt longitudinally and contact with one or more loaves of different heights at the same time and, by means of its weight, force the loaf, as before mentioned, down on to the surface of the wicking material in the waxing tank to apply wax to the last lap or underneath fold just described. After passing the waxing tank, it is carried along on to the table or cooling plate 105, where the weight of the before mentioned pressure plate and the length of the cooling plate, will firmly set the wax and seal the wrapper before the loaf is finally delivered from the plate. The tank is insulated or separated from the cooling plate by a space sufficient to prevent heat radiating from the tank to the plate, thus keeping the plate comparatively cool.

As hereinbefore described, the chamber 97 (Figs. 5, 25 and 27) is heated so as to keep the felt in chamber 96 saturated with the sealing material, said felt acting as a wick over which the loaf, with the final fold of the wrapper underneath, is slid with a wiping action. The conductivity of the metal of the chamber 96 will, of course, result in the upper edges of said chamber being kept at a temperature as high as that of the sealing material. Said upper edges are thickened, as shown. The bridge 119 intermittently occupies the position shown in Fig. 27, and, of course, has some heat transmitted to it from the thickened upper edge of the chamber on which it rests at such times. Therefore, as the wrapped loaf moves over said bridge and the adjacent thickened upper edge of the chamber, the paper is warmed before it reaches the wick, and consequently the sealing material, of wax-like nature, is not hardened or congealed too quickly, as would be the case if the paper reached the wick or applier cold. Premature hardening or congealing results in too thick a coating and interferes with proper sealing. The ends of a loaf are also waxed at the same time as the bottom by means of the vertical extension 96ᵃ, Figs. 5, and 37. After passing over the waxing surface, represented by the parts 96 and 96ᵃ, the loaf is forced through the superheater 97ᶜ, 97ᵈ, Figs. 5 and 27. This superheating portion of the tank is simply a solid extension of the end and horizontal parts of the waxing chamber and in which is stored up sufficient heat to force the wax through the paper. The downward pressure on the loaf when over the waxing tank and superheater is furnished as before mentioned by the gravity weight of the shoe 120, and the distance between the end walls 67ᵇ is sufficient only to allow the loaf and its wrapper to be forced through.

The operation of the machine is such that each sheet or section is severed from the web before any contact or association of the section with the article to be wrapped occurs, or in other words before the piece of material which is to serve as the wrapper reaches the article which is to be wrapped in that piece. This provides for wrapping each article without having to produce any tension upon the web transmitted through the article itself and therefore, the article, such as a soft loaf of bread, will not be compacted by the act of determining the size of the wrapper.

All parts of the machine which cause the articles to pass through while being introduced and wrapped and delivered move continuously, said parts comprising the several pairs of endless chains and the blades or carriers attached to said chains. Therefore, the speed of operation of the machine is not hampered nor the machine racked by the inertia and momentum by any article-carrying device.

The feed chain 62 and its pushers or carriers 72 introduce the articles to the machine, the said articles being of course, spaced according to the distance of the carriers 72 from each other. The articles are therefore introduced to the machine and delivered to the carriers which move them while being wrapped at uniform intervals, or in other words at just the proper timing to be taken by the second carriers which move the articles while being wrapped without posibility of clogging the machine with said articles.

The final act of wrapping is performed when the articles are removed laterally from the upper end of the elevator shaft or vertical passageway, because the final flap $B^7$ of the wrapper is caused to be turned under the loaf and then slid along over the sealing wick and over the table or plate 105, and each article is held under substantially uniform pressure, and not an intermittent pressure, as it is slid along the table by the pushers or carriers 34. This uniformity of pressure prevents any liability of the final flap or fold $B^7$ springing away from the layers or flaps to which it is being sealed.

It will be understood that I do not wish to be strictly held to the exact construction shown in the several views, as many minor changes could readily be made without departing from the spirit of my invention.

While I show the wrapper lifters adapted to give a central bulge or crown to the wrapper in advance of the loaf, and actuating the lifters by direct contact of the loaf therewith. I hold myself at liberty to actuate said lifters by automatic mechanical means independently of the loaf, and, instead of their being pivotally supported on the front and rear plates of the elevator shaft as shown, they could be suspended at any other accessible point that will insure the desired result, which, as before stated, is to form a swell in the body of the wrapper and in advance of the loaf, and, at the proper time, apply sufficient tension on the wrapper so that it will be drawn into the proper shape without being skewed or otherwise distorted. In using the term "lifters" I desire it to be distinctly understood that said term also comprises a single lifter, as the same result could be accomplished.

While I show and claim specific mechanism controlled by the gage to feed the required amount of paper to form a wrapper for each individual loaf actuating the gage, it will readily be seen that one skilled in the art to which this invention belongs could devise various other mechanical contrivances that could be set in motion by the loaf actuating gage to accomplish the same result. The essential feature, therefore, is a gage or controller actuated by each loaf as it passes into the machine and, by the movement of the gage, actuate mechanism to feed the requisite amount of paper to form a wrapper for the loaf that actuated the gage. In employing the term "gage" or "controller", I desire it to be distinctly understood that said term or terms comprise any movable device adapted to be actuated by a loaf to influence the paper feeding mechanism.

While I show the pressure plate 120 as being actuated by gravity in order to maintain two loaves of different heights in workable contact with the waxing tank, superheater and cooling plate, and maintain an equal presure on both, I hold myself at liberty to use springs, or spring actuated plates, or in fact, any yielding pressure that would effect the same purpose. The waxing tank may be dispensed with and the paper impregnated with wax or other like sealing agent adapted to seal the several folds of the wrapper when brought in contact with proper means for heating the same.

Having thus described my invention, what I claim as new is:—

1. In a bread wrapping machine, or machine of like character, a gage with which loaves of different heights are adapted to engage, combined with suitable automatic paper feeding mechanism controlled by said gage to feed the amount of paper required to form a wrapper for each individual loaf actuating the gage.

2. In a bread wrapping machine, or machine of like character, a movable gage adapted to be engaged and actuated by loaves of different heights, paper feeding mechanism controlled by said gage to feed the required amount of paper to form a wrapper for each individual loaf actuating the gage, combined with automatic cutting off mechanism.

3. In a bread wrapping machine or machine of like character, a movable gage with which loaves of different heights and of irregular upper surfaces are adapted to engage, combined with suitable paper feeding mechanism adapted to be controlled by the gage to feed the required amount of paper to form a wrapper for each individual loaf actuating the gage.

4. In a bread wrapping machine or machine of like character, a movable loaf actuated gage combined with paper feeding mechanism, to control the operation of the latter to feed the required amount of paper to form a wrapper for the loaf actuating the gage.

5. In a bread wrapping machine, paper feeding mechanism combined with a gage actuated by a loaf to control the feeding mechanism to feed the required amount of paper to form a wrapper for the loaf actuating the gage, whereby the amount of paper to form a wrapper is varied according to the size of the loaf to be wrapped.

6. In a bread wrapping machine or machine of like character, a movable gage adapted to be actuated by a loaf, automatic paper feeding mechanism controlled by the gage to feed the required amount of paper to form a wrapper for each individual loaf actuating the gage, a shoe or other like member pivotally mounted on the gage and adapted thereby to contact with the irregular transverse upper surface of a loaf and thus equalize or average the movement of the gage with respect to the average transverse height of the loaf.

7. In a bread wrapping machine or machine of like character, a movable gage adapted to be actuated by loaves of different heights, a rotatable feed roll, a rotatable drum over which paper is adapted to be fed from a reel or other like source of supply and between the feed roll and drum, mechanism associated with the drum adapted to be controlled through the medium of the gage to bring the feed roll in contact with the paper and feed the same a distance suitable to form a wrapper for the loaf actuating the gage, and mechanism also associated with the drum to raise the feed roll when the paper has been fed the proper distance required to form the wrapper.

8. In a bread wrapping machine or machine of like character, a movable gage adapted to be actuated by loaves of different heights, a support for the gage, a rotating drum, a feed roll normally supported out of contact with the drum, a pivoted support therefor, mechanism associated with the drum adapted to be controlled by the gage to release the feed roll to contact with the drum and feed the required amount of paper to form a wrapper for the loaf actuating the gage, means for disengaging the feed roll from the drum, means for automatically cutting off a wrapper section, and means for clamping the paper after said section is severed to prevent the paper falling off from the drum.

9. In a bread wrapping machine or machine of like character, a rotatable paper feed roll, a rotatable drum over which the paper is adapted to be fed, mechanism associated with the drum to automatically bring the feed roll in contact with the drum to feed the paper, means for disengaging the feed roll therefrom, a movable gage adapted to be engaged and actuated by a loaf, and means intermediate the gage and drum mechanism whereby the latter is controlled.

10. In a bread wrapping machine or machine of like character, a movable gage adapted to be actuated by a loaf, suitable paper feeding mechanism controlled by the gage to feed the paper a distance predetermined by the loaf, combined with cutting off mechanism adapted to cut off a section of paper to form a wrapper for the loaf actuating the gage.

11. In a bread wrapping machine or machine of like character, a rotating paper feeding drum, a rotating paper feed roll held normally out of contact with the drum, a movable gage adapted to be actuated by a loaf, mechanism intermediate the gage and drum whereby the feed roll is brought into working relation with the drum to feed paper a distance predetermined by the loaf, mechanism for carrying the feed roll out of contact with the drum, and mechanism for cutting off a section of paper to form a wrapper for the loaf actuating the gage.

12. In a bread wrapping machine or machine of like character, a drum over which paper is adapted to be fed, a feed roll journaled on a movable support, means for rotating said roll and drum, a movable gage adapted to be actuated by a loaf, a series of gage pins carried by the drum adapted to be actuated by the gage, each pin governing the length of paper to be fed, a series of trip pins operatively connected to the gage pins, a feed roll lifting lever, and a feed roll trip lever, the latter adapted to be actuated by one of the trip pins to release the feed roll, and means on the drum adapted to actuate the former to elevate the feed roll when sufficient paper has been fed to form a wrapper for the loaf actuating the gage.

13. In a bread wrapping machine or machine of like character, a movable gage carrying a shoe or other like means movably connected to the gage whereby it may adjust itself to the irregular surface of the top of a loaf, paper feeding mechanism operatively connected with the gage so that when the shoe end of the gage is actuated by a loaf the paper feeding mechanism is controlled to deliver sufficient paper to form a wrapper for the loaf engaging the shoe, means for severing a wrapper section therefrom.

14. In a bread wrapping machine or machine of like operation, automatic mechanism adapted to feed and cut off a section of paper to form a wrapper, a guideway shaped to prevent rotation of loaves being conveyed therethrough, wrapper folding mechanism, and a series of traveling carriers movable through said guideway, each carrier being adapted to associate an unwrapped loaf with a wrapper and then convey said loaf and its wrapper through the various stages of folding the wrapper about the loaf to completely inclose it.

15. In a bread wrapping machine or machine of like character, automatic mechanism adapted to feed and cut off a section of paper to form a wrapper, a guideway shaped to prevent rotation of loaves being conveyed therethrough, wrapper folding mechanism, a series of traveling carriers, movable through said guideway, each carrier being adapted to associate an unwrapped loaf with a wrapper and then convey said loaf and its wrapper through the various stages of folding the wrapper about the loaf to completely inclose it, and means for sealing each wrapper after the folding operation is completed.

16. The combination with automatic mechanism for feeding paper and cutting a section therefrom to form a wrapper for an article, of wrapper folding mechanism, vertically operating and endlessly movable carriers adapted to convey an article with its wrapper through the several operations of the folding mechanism whereby the wrapper is folded while in transit on said carriers, means for sealing the wrapper, and horizontally operating and endlessly movable carriers for conveying the article and its wrapper through the sealing operation.

17. The combiantion with mechanism adapted to fold a wrapper about a loaf of bread, of wrapper lifters located in advance of the loaf and below the folding mechanism, and means for advancing a loaf through the lifters and folding mechanism.

18. The combination with mechanism adapted to fold a wrapper about a loaf of bread, of wrapper lifters located below the folding mechanism and adapted to act in advance of a loaf to elevate or form a swell in the body of the wrapper intermediate its ends, and means for advancing a loaf through the lifters and folding mechanism.

19. In a machine adapted to feed, and cut off a section of paper to form a wrapper for a loaf, wrapper lifters underlying the wrapper and adapted to be actuated by a loaf to uplift the central portion of the wrapper, and means for advancing the loaf through the lifters.

20. In a wrapping machine, wrapper folders, and wrapper lifters located below the folders and adapted to elevate or uplift the central portion of a wrapper as a preliminary step to the wrapping process.

21. In a wrapping machine, wrapper folders, wrapper lifters, located below the folders and adapted to elevate the central portion of a wrapper as a preliminary step to the wrapping process, and means for applying tension on the wrapper.

22. In a bread wrapping machine, a stationary plate and a yielding plate adapted to form the sides of an elevator shaft, a series of carriers adapted to transport a loaf through the shaft, combined with wrapper folding mechanism located in the shaft.

23. In a bread wrapping machine, a stationary plate and a yielding plate adapted to form the sides of an elevator shaft, sprocket wheels, chains therefor, a series of loaf carriers pivotally supported on the chains, and means whereby said carriers are guided through the shaft to properly support a loaf.

24. In a bread wrapping machine, a series of pivotally supported and endlessly movable bread carriers, bread wrapping mechanism, and means for maintaining said carriers in a proper position for supporting a loaf while traversing the bread wrapping mechanism.

25. In a bread wrapping machine, a series of loaf carriers, endless chains on which said carriers are pivoted, bread wrapping mechanism, guides for maintaining the carriers in proper position for holding a loaf to be wrapped, and means for tilting the carriers at the limit of their upward travel and turn them in the proper direction to hang freely on their pivoted supports until again within the embrace of the guides.

26. In a bread wrapping machine, an elevator shaft comprising a vertical stationary plate, and a vertical yielding plate, paper feeding mechanism adapted to feed the paper under the elevator shaft, cutting off mechanism adapted to cut a section therefrom to form a wrapper, continuously movable loaf carriers, wrapper lifters adapted to elevate the central portion of the wrapper in advance of the loaf, means for applying tension to the wrapper as it is being drawn into the shaft, breakers for turning down the wrapper against the ends of the loaf, folders for completing the end folds, a side bottom folder, means for actuating the same to complete one side bottom fold, mechanism adapted to make the end bottom folds, and means for completing the final fold.

27. In a bread wrapping machine, a series of continuously moving loaf carriers adapted to convey a loaf through the various folding operations, wrapper folding mechanism, wrapper lifters adapted to elevate or crown the central portion of the wrapper in advance of the loaf, and to retire while the loaf engages the uplifted portion of the wrapper to force said wrapper through the various wrapper folding operations.

28. In a bread wrapping machine, a series of continuously moving loaf carriers adapted to convey a loaf through the various folding operations, wrapper folding mechanism, wrapper lifters adapted to elevate or crown the central portion of the wrapper in advance of the loaf and retreat temporarily to make room for the engagement of the loaf with the wrapper, means for exerting a tension on the wrapper as it is being drawn upward by the loaf and under the moving influence of the carriers.

29. In a bread wrapping machine, an elevator shaft, a series of continuously moving loaf carriers adapted to travel therethrough, wrapper lifters operatively located at the bottom of the shaft to elevate or uplift the central portion of a wrapper in advance of the loaf and then retreat temporarily to make room for the engagement of the loaf with the wrapper, means for exerting a tension on the wrapper as it is being drawn into the shaft, end breakers adapted to break down the wrapper over the ends of the loaf to form the folds $B^1$ of the package, end corner folders adapted to form the folds $B^3$, and advanced end corner folders to form the folds $B^4$.

30. In a bread wrapping machine, in combination with mechanism adapted to form the various end and end bottom folds or wraps for a loaf, and vertically operating carriers adapted to convey a loaf through the several folding operations of said folders, of a series of horizontally movable carriers, a folder for one of the side bottom folds, means for actuating said folder against the bottom of the loaf and maintaining it in such position through the influence of the horizontally operating carriers when the vertically operating carrier has been removed and thus form a temporary support for the loaf, a waxing tank, a loaf support between the tank and side bottom folder so that, as the loaf is moved horizontally, the remaining bottom fold of the wrapper will be forced against the bottom of the loaf and thus complete the folding operation.

31. In a wrapping machine, means for inclosing articles in wrappers with external folds of the wrappers underneath the articles, a waxing tank, a cooling plate, a series of horizontally movable carriers for pushing the wrapped articles over the waxing tank and cooling plate, and a yielding pressure plate adapted to rest on the top of one or more articles and accommodate itself so as to exert continuous pressure on articles of different heights, and hold said external folds of the wrappers on the cooling plate.

32. In a wrapping machine, a series of horizontally movable article carriers, a waxing or sealing tank, a movable member held normally upright and adapted to be forced into a horizontal position by a moving article to form a bridge for the article in its passage to the tank.

33. In a bread wrapping machine, flexible stationary end breakers, endlessly movable carriers for carrying a loaf and its wrapper through said breakers to break down a portion of the wrapper to cover the ends of a loaf, two pairs of pivotally supported helical end folders, one pair located in advance of the other and adapted to successively complete the end folds while a loaf is still in the embrace of the flexible end breakers.

34. In a bread wrapping machine, a frame or other like support, a carriage adjustably mounted thereon, paper feeding mechanism, a loaf actuated gage controlling said mechanism, paper cutting mechanism, a heater and waxing tank, and a cooling plate all mounted on said carriage and actuated therewith.

35. In a bread wrapping machine, bread wrapping mechanism comprising end breakers, end corner folders and vertically traveling carriers adapted to convey a loaf through the above named wrapping mechanism, combined with a side bottom folder and its actuating lever, end bottom folders and their actuating lever, and horizontally traveling carriers adapted to successively actuate said levers to form the side bottom fold and end bottom folds, and means adapted to be engaged by a horizontally movable loaf to effect the other side bottom fold and thus complete the folding or wrapping process.

36. A wrapping machine having means for supplying a wrapper for each article to be inclosed thereby, folding instrumentalities for inclosing each article in a wrapper, and means for automatically determining the size of the wrapper for each article in accordance with the size of that article, said means including a cutter and devices for causing the operation of the cutter before contact of the article with its wrapper.

37. A wrapping machine having feeding mechanism for a web of wrapper material, a cutter for severing the web into sheets, folders for inclosing each article in a wrapper sheet, and means controlled by the passage of each article on its way to be assembled with its wrapping sheet for determining the relative operation of the feeding mechanism and cutter according to the size of said passing and controlling article.

38. A wrapping machine having a guideway for the articles to be wrapped, a carrier movable in one direction through the guideway, means for severing a web into sheets, means for locating each sheet transversely of the guideway in the path of movement of an article whereby said sheet is assembled with the article while it is being moved through the guideway by said carrier, and a plurality of folders at different distances along the guideway and adapted to perform their operations during the passage of an article that is being moved by said carrier.

39. A wrapping machine having a guideway for the articles to be wrapped, a carrier movable in one direction through the guideway, a plurality of folders at different distances along the guideway and adapted to perform their operations during the passage of an article that is being moved by said carrier, and means for causing the carrier to retreat at one point of its travel to permit folders to take its place.

40. A wrapping machine having a guideway for the articles to be wrapped, a series of article-carriers movable in succession through said guideway, means for severing a web into sections to form wrapper sheets, a plurality of folders at different distances along said guideway, and means for automatically introducing a wrapper sheet into position across the guideway in the path of movement of each article while the latter is being moved through the guideway by its carrier toward the first of the folders.

41. A wrapping machine having a substantially vertical guideway for the articles to be wrapped, a plurality of folders at different distances along said guideway, an endless series of article-carriers upwardly movable through the guideway, means for supplying an article to be wrapped to a position above each carrier, means for supplying a wrapper sheet above each article before it reaches the first folders, and means for removing the articles in wrapped condition.

42. A bread-wrapping machine having a plurality of independently movable helical folders on each of two sides of the path of movement of the loaf and its wrapper, said folders having edge portions adapted to be acted upon by the passing loaf to be shifted thereby and to fold the wrapper in below projecting portions of the loaf, the folders being located one in advance of another at each of said two sides to act successively on different portions of the wrapper.

43. A bread-wrapping machine having a plurality of independently movable folders having helical edges and pivotally supported one in advance of another at each side of, and at a distance from, the path of movement of the surfaces of the loaf and free to be swung upwardly and outwardly by the loaf in passing and to return by gravity, the pivots of said folders being below the plane of action of said helical edges.

44. A bread-wrapping machine having at each side of the path of movement of the loaves a plurality of independent pivotally supported folders provided with spiral-shaped fold-turning faces, the pivots of said folders being below the plane of action of said spiral-shaped faces, and said folders being located one in advance of another to act successively on the wrapper.

45. A bread-wrapping machine having at each side of the path of movement of the loaves a plurality of independent pivotally supported folders provided with spiral-shaped fold-turning faces, the pivots of said folders being below the plane of action of said spiral-shaped faces, and said folders being located one in advance of another to act successively on the wrapper, the extreme ends of some of the folders presenting wide substantially straight edges to smooth down the turned folds.

46. A wrapping machine having coöperating folding devices for inclosing articles of non-uniform size in sections of sheet material, means for severing a web of the material into sections before it reaches the articles, and means controlled by the size of each article for determining the size of the section for that article.

47. A wrapping machine having a plurality of continuously movable carriers for moving the articles to be wrapped, one of said carriers being timed to deliver the articles to the next carrier, at uniform intervals, means for feeding a web of paper and severing it to provide wrappers, means in the path of movement of each article that is being moved by the first carrier to control the operation of the paper feeding and severing means, and folders for acting on the wrappers of the articles while the latter are being moved by the second carrier.

48. A wrapping machine having a plurality of endless series of carriers operating in different planes which intersect each other for successively moving the articles to be wrapped, said carriers being relatively arranged to deliver the articles from one to another, the first carrier having means for spacing the articles uniformly, means for associating wrappers with the articles after the articles are in position relatively to the first carrier, folders for acting on the wrappers of the articles while the latter are being moved by the second series of carriers, and means for completing the wrapping after the articles are engaged by the third series of carriers.

49. A wrapping machine having three continuously and successively operating carriers moving in different planes which intersect, the first having means for introducing articles to the machine at uniformly spaced distances, the second having means for taking the articles from the first, means adjacent the second carrier for folding wrappers around the articles while in transit, the third carrier having means for taking articles from the second and delivering them from the machine.

50. A wrapping machine having a continuously operating carrier for introducing articles to the machine, a second continuously operating carrier, folders at opposite sides of the path of movement of said second carrier, and a third continuously operating carrier for delivering the wrapped articles, all of said carriers being mounted to move in different planes which intersect each other.

51. A wrapping machine having a continuously operating carrier for introducing articles to the machine, a second continuously operating carrier, folders at opposite sides of the path of movement of said second carrier, a third continuously operating carrier for delivering the wrapped articles, all of said carriers being mounted to move in different planes which intersect each other, and means for sealing the articles while being moved by the said third carrier.

52. A machine having folders for inclosing articles in wrappers, a table, a carrier for moving the wrapped articles over said table, said folders being relatively arranged to fold the final flap against the surface of the article which moves in contact with said table, and a wick having its operative portion substantially in the plane of the surface of the table for applying sealing material to the portions of the wrapper including said final flap moving along the table.

53. A wrapping-machine having a table, continuously movable means for sliding wrapped articles over said table without interruption in said movement, means for applying sealing material to the external surfaces of the portions of the wrappers sliding along the table, and means for holding each article under substantially uniform pressure as it is slid along the table, to make the sealing permanent.

54. A wrapping machine having a substantially vertical passageway, means for moving articles upwardly through said passageway, a series of successively operating wrapper folders at the sides of said passageway, means for introducing the articles to the lower end of said passageway from a point at one side thereof, and means for effecting a final folding and simultaneous lateral delivery of the articles from the upper end of the passageway.

55. A machine of the character described having mechanism for folding a wrapper about an article, means for warming a final flap of the folded wrapper, means for applying heated sealing material to said final flap, and means for passing the wrapped article with said final flap first past the warming means and then past the material applier, whereby the wrapper is preliminarily warmed to prevent the sealing material from hardening prematurely.

56. In a wrapping-machine the combination with wrapping mechanism of means for feeding wrapping material, and means actuated by the passage of the article to be wrapped for operating said feeding means, said operating means including means for proportioning the size of the wrapper to the size of said article.

57. In a wrapping-machine the combination with wrapping mechanism of means for feeding wrapping material, and means actuated by the passage of the article to be wrapped for operating said feeding means, said operating means including means for proportioning the size of the wrapper to the height of said article.

58. In a wrapping-machine, the combination with wrapping mechanism of means for feeding the articles to be wrapped, wrapper feeding mechanism, and a measuring member for varying the operation of said wrapper feeding mechanism to proportion the size of each wrapper to conform to the size of the article to be wrapped.

59. In a wrapping-machine, the combination with wrapping mechanism, of means for feeding the articles to be wrapped, wrapper-feeding mechanism, and a measuring member for varying the operation of said wrapper-feeding mechanism to proportion the size of each wrapper to conform to the size of the article to be wrapped, said measuring member being provided with means for successively engaging said articles.

60. In a wrapping-machine, the combination with wrapping mechanism, of means for feeding the articles to be wrapped, wrapper-feeding mechanism, and a measuring member provided with means for controlling said wrapper-feeding mechanism, said measuring member being provided with a laterally extended feeler bar to engage the articles to be wrapped.

61. In a wrapping-machine, the combination with wrapping mechanism, of means for positioning the wrapper to receive the article to be wrapped, and means controlled by the size of said article for regulating the operation of said positioning means.

62. A wrapping machine having a straight guideway for wrapped articles, means for heating one portion of the guideway while permitting another portion to remain cool, and folders for folding portions of the wrapper on its way to said guideway, the cool portion of the guideway being smooth and continuous to provide a surface for exerting a wiping action on the wrapper slid along said surface.

63. Mechanism for wrapping and sealing articles, comprising folders for converting portions of a wrapper into flaps and overlaying said flaps upon other portions of the wrapper, a straight guideway having a bottom and upright sides for maintaining said flaps in overlaid positions, and heating and cooling means in position to effect the sealing operation before the flaps can open, the cooling means comprising a stationary, flat, smooth, continuous surface for exerting a wiping action on the wrapper slid over it.

64. Mechanism for wrapping and sealing articles, comprising folders for converting portions of a wrapper into flaps and overlaying said flaps upon other portions of the wrapper, a straight guideway having a bottom and upright sides for maintaining said flaps in overlaid positions, heating and cooling means in position to effect the sealing operation before the flaps can open, the cooling means comprising a stationary, flat, smooth, continuous surface for exerting a wiping action on the wrapper slid over it, and means for exerting pressure upon the articles in said guideway.

65. A wrapping machine having a table, continuously movable means for sliding wrapped articles over said table without interruption in said movement, means for applying heated wax to the external surfaces of the portions of the wrappers sliding along the table, said table having a portion to cool the heated wax, and means for holding each article under substantially uniform pressure as it is slid along the cooling portion of the table, to make the sealing permanent.

66. A bread wrapping machine having means for assembling loaves with wrapping material, a series of successively operating wrapper folders, means for carrying the loaves and wrappers past said folders in spaced relationship, a heater, a stationary cool plate beyond the heater, and means for yieldingly holding the wrapped loaves in contact with said heater and cool plate while said loaves are in transit.

67. A bread wrapping machine having means for assembling loaves with wrapping material and draping said material over the tops and sides of the loaves, folders in position to turn portions of the wrappers over the ends of the loaves and against the bottom thereof, a heater, and means for carrying the wrapped loaves past the heater with the wrapper portions that are against the bottoms of the loaves in contact with said heater.

In testimony whereof I affix my signature in presence of two witnesses.

HENRI A. SÉVIGNÉ.

Witnesses:
 GEO. D. PHILLIPS,
 JAMES FEELEY.